May 24, 1949.　　　　G. W. LINDSTROM　　　　2,471,221
ELECTRIC FOOT-WARMING OTTOMAN
Filed May 18, 1948
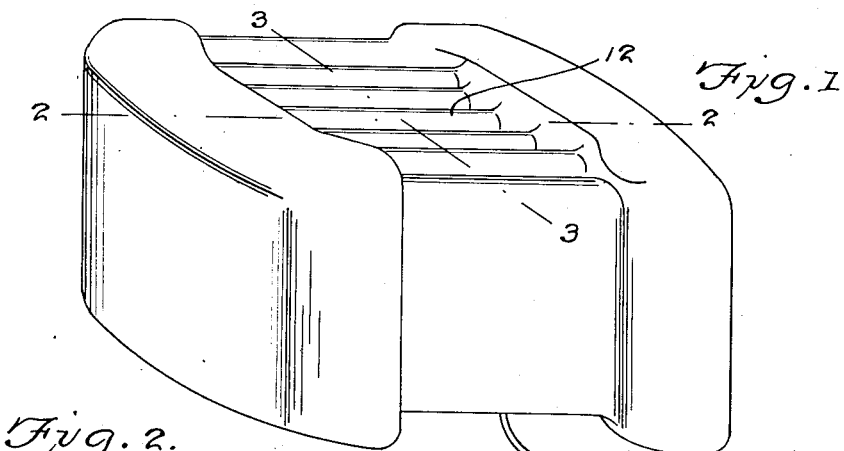
Fig. 1.
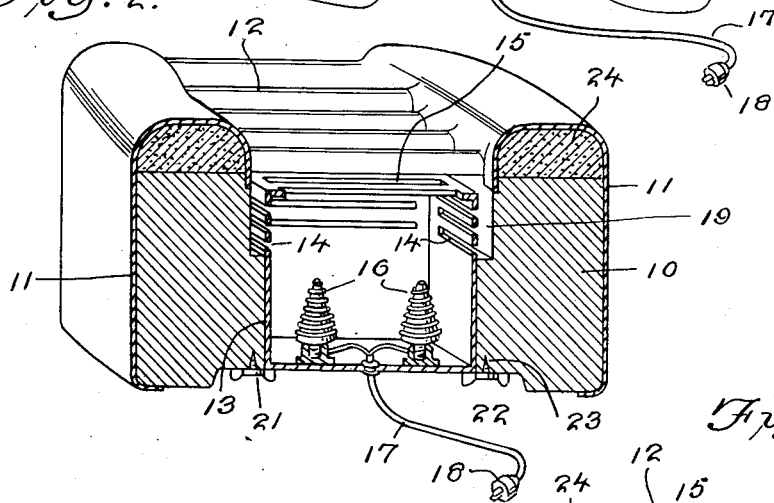
Fig. 2.
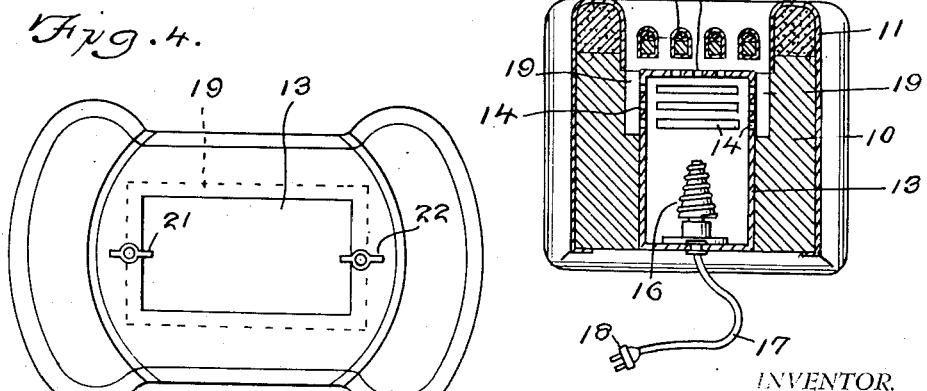
Fig. 4.
Fig. 3.
INVENTOR.
George W. Lindstrom
BY Victor J. Evans & Co.
ATTORNEYS Patented May 24, 1949

2,471,221

UNITED STATES PATENT OFFICE 2,471,221

ELECTRIC FOOT-WARMING OTTOMAN

George W. Lindstrom, Westport, Conn.

Application May 18, 1948, Serial No. 27,659

1 Claim. (Cl. 219—19)

This invention relates to an electric foot-warming ottoman.

It is an object of the present invention to provide an ottoman with an electric heating device whereby while resting the feet thereon the feet can be warmed and wherein the heating unit is removably connected to the interior of the ottoman so that it can be removed as a unit for the purpose of repair or so that the unit can be used separately of the ottoman for other heating purposes.

Other objects of the present invention are to provide an electric heated ottoman which is of simple construction, easy to assemble, inexpensive to manufacture and efficient in operation.

For other objects and for a better understanding of the invention, reference may be had to the following detailed description taken in connection with the accompanying drawing, in which—

Fig. 1 is a perspective view of the ottoman embodying the features of the present invention.

Fig. 2 is a longitudinal sectional view of the ottoman taken generally on line 2—2 of Fig. 1.

Fig. 3 is a sectional view of the ottoman taken generally on line 3—3 of Fig. 1.

Fig. 4 is a bottom plan view of the ottoman.

Referring now to the figures, 10 represents the filling material of an ottoman over which is extended a covering 11. The center of the ottoman is open from the top to the bottom and extended across the top are ottoman bars 12 spaced from one another in order to permit the passage upwardly from the interior of the ottoman of heated air. The feet will be rested upon these bars 12 in order to lie in the path of the heated air.

Into the center of the ottoman there is removably disposed a casing 13 having side openings 14 and top grate openings 15 lying beneath the bars 12. On the bottom of the casing and extending upwardly therefrom are heating elements 16 which can be connected to a wall receptacle by a cord 17 and a plug 18.

Adjacent the side openings 14, the opening within the ottoman is enlarged or stepped as indicated at 19 so that air circulation through the heater casing 13 can be effected. The heated air will rise through the grate bars 15 and upwardly through the bars 12 for engagement with the feet and the cool air will pass down the sides of the bars 12 and down the side of the casing 13 through the enlarged space 19 and into the casing 13 through the side openings 14 for the purpose of being heated before being extended upwardly. The casing 13 is removably secured within the opening and is normally retained in place by turn buttons 21 and 22 connected to the ottoman at the sides of the opening. The filler 10 may comprise wood material for receiving screws 23 which retain the buttons 21 and 22. Over the wood there can be extended more soft filler material as indicated at 24.

While various changes may be made in the detail construction, it shall be understood that such changes shall be within the spirit and scope of the present invention as defined by the appended claim.

I claim:

An electric foot-warming ottoman comprising a main body having an opening extending vertically therethrough, foot rest bars spaced from one another and extending over the top of the opening, and a heater unit disposed in the opening beneath the foot rest bars, said heater unit including a casing having top and side openings, the opening in the main body being inset adjacent the side openings of the heater casing whereby to provide a recess for circulation of air through the heater casing and the foot rest bars and means carried by the bottom of the main body for retaining the heater unit within the body.

GEORGE W. LINDSTROM.

REFERENCES CITED

The following references are of record in the file of this patent:

UNITED STATES PATENTS

| Number | Name | Date |
|---|---|---|
| 1,377,435 | Rasen | May 10, 1921 |
| 1,398,384 | Loeser | Nov. 29, 1921 |
| 1,860,420 | Johnson | May 31, 1932 |